United States Patent [19]
Decker et al.

[11] 3,970,104
[45] July 20, 1976

[54] FUEL FILTER BYPASS VALVE WITH CONDITION PRELIMINARY INDICATOR AND SECONDARY INDICATOR

[75] Inventors: Maurice S. Decker, Columbus, Ohio; George T. Downey, Corry, Pa.

[73] Assignee: Midland-Ross Corporation, Cleveland, Ohio

[22] Filed: Jan. 9, 1975

[21] Appl. No.: 539,814

[52] U.S. Cl. .............................. 137/494; 137/554; 116/70; 210/90; 210/130
[51] Int. Cl.[2] .......................................... F16K 37/00
[58] Field of Search ........... 137/494, 554, 553, 557, 137/551; 210/90, 85, 91, 133, 134, 130; 251/77, 78; 116/70, DIG. 25

[56] References Cited
UNITED STATES PATENTS

| | | | |
|---|---|---|---|
| 2,943,446 | 7/1960 | Goodall et al. | 210/90 X |
| 3,150,633 | 9/1964 | Holl | 116/70 |
| 3,420,266 | 1/1969 | Downey | 210/90 X |
| 3,441,138 | 4/1969 | Rosaen et al. | 210/90 |
| 3,451,551 | 1/1969 | Sample et al. | 210/90 |
| 3,487,929 | 1/1970 | Sample et al. | 210/90 |
| 3,703,191 | 11/1972 | Ekstrom | 137/494 |

*Primary Examiner*—Martin P. Schwadron
*Assistant Examiner*—Robert J. Miller
*Attorney, Agent, or Firm*—H. Duane Switzer

[57] ABSTRACT

A fuel filter bypass valve assembly includes a valve body having inlet and opposite sides. A movable member is peripherally sealed to the opposite side, and moves toward and away therefrom to define a variable volume chamber. Port means extends past the valve body for establishing communication between such chamber and the valve body inlet side. Yieldable biasing means is connected with the movable member for normally biasing same toward the valve body opposite side and biasing the entire assembly in a direction for positioning the inlet side against a valve seat. Cooperating stop means between the movable member and valve body limits movement of such movable member away from the valve body opposite side. The movable member and valve body are proportioned so that the pressure required to move the movable member away from the valve body against the force of the biasing means is substantially less than the pressure required to move the valve body away from the valve seat against the force of the biasing means.

9 Claims, 11 Drawing Figures

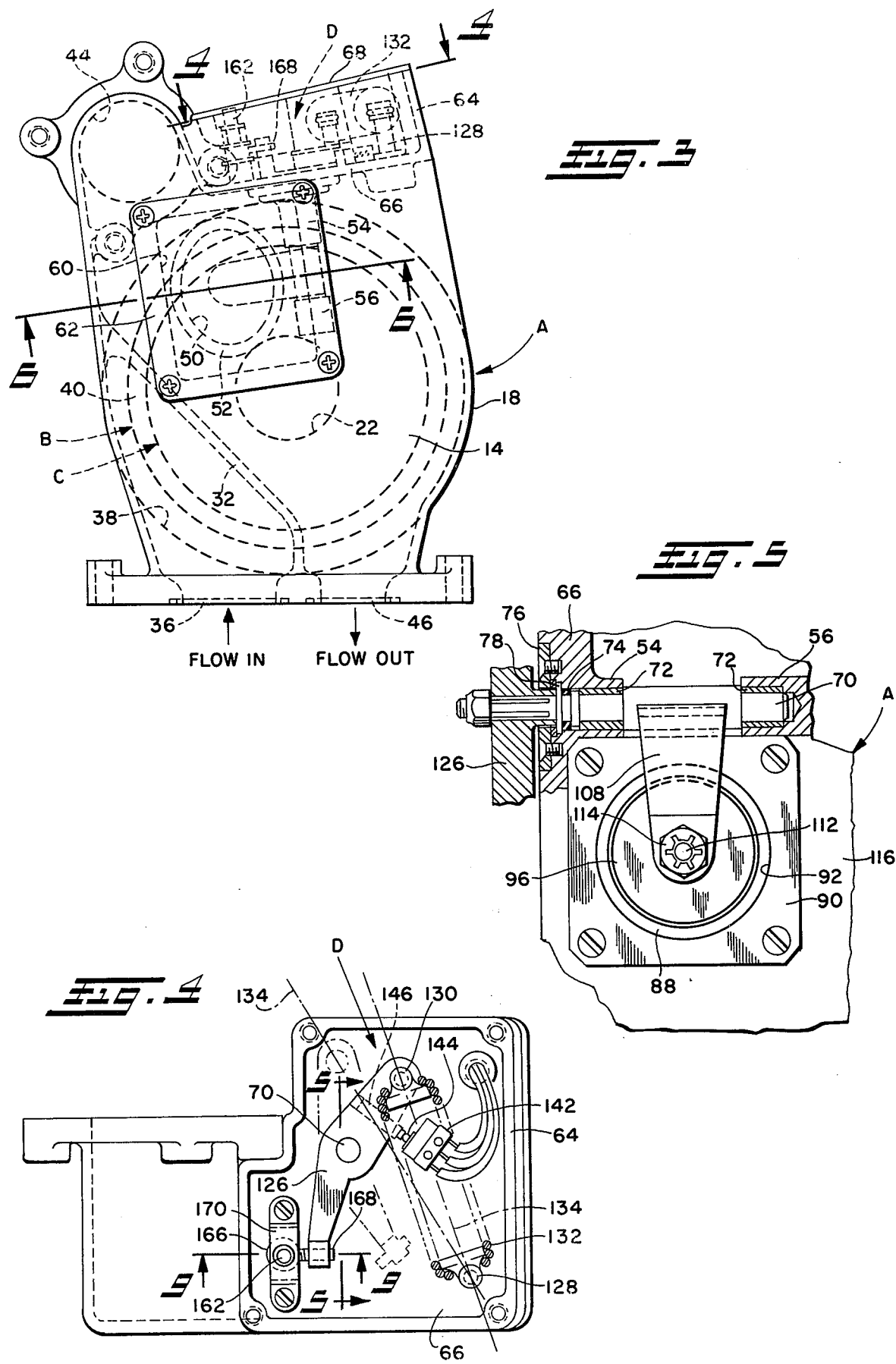

FUEL FILTER BYPASS VALVE WITH CONDITION PRELIMINARY INDICATOR AND SECONDARY INDICATOR

BACKGROUND

This application pertains to the art of valves and, more particularly, to bypass valves. The invention is particularly applicable for use with liquid fuel filters and will be particularly described with reference thereto. However, it will be appreciated that the invention has broader aspects, and can be used with other fluid filters and in other fluid systems having bypass valves.

Fuel filter assemblies commonly have a bypass valve which opens when the filter element becomes clogged. It is common to provide a signal light which is turned on when the bypass valve opens for indicating a clogged filter condition. It is also common to provide another signal device on the filter assembly itself which locks in an indicating position and cannot be reset without removing the filter element.

Prior patents related to the subject matter of this application include Downey U.S. Pat. No. 3,442,384; and Sample U.S. Pat. No. 3,451,551 and U.S. Pat. No. 3,487,929.

In many prior arrangements of the type described, the bypass valve cracks open at a relatively low pressure and the signal light does not go on until such valve is cracked open so that some fuel is already being by-passed.

It would be desirable to have an arrangement wherein the signal light would go on prior to complete clogging of the filter for indicating that clogging of the filter is impending. The filter element can then be replaced before the bypass valve opens.

SUMMARY

A fuel filter assembly of the type described has a bypass valve assembly which include a valve body having inlet and opposite sides. A movable member is peripherally sealed to the opposite side of the valve body, and is movable toward and away therefrom to define a variable volume chamber. A port past the valve body establishes communication between the variable volume chamber and the inlet side of the valve body.

In one arrangement, yieldable biasing means is connected with the movable member for biasing such member toward the opposite side of the valve body and in turn biasing the entire assembly in a direction for positioning the inlet side of the valve body against a valve seat. Cooperating stop means between the movable member and valve body limits movements of such movable member away from the opposite side of the valve body.

With a bypass valve assembly of the type described, fluid pressure acting on the inlet side of the valve body is communicated through the port to the variable volume chamber for moving the movable member away from the valve body against the force of the yieldable biasing means until the stop means is reached. When the movable member reaches the stop means, fluid pressure acting against the inlet side of the valve body moves the entire assembly against the force of the yieldable biasing means to separate the valve body from the valve seat.

In a preferred arrangement, the movable member comprises a flexible diaphragm which has an area facing the variable volume chamber which is greater than the area of the inlet side of the valve body. With such an arrangement, the fluid pressure required for moving the diaphragm away from the valve body against the force of the biasing means is substantially less than the pressure required to move the valve body away from its seat.

A first signal is connected for operation by movement of the diaphragm away from the valve body to indicate an impending filter clogged condition. The bypass valve itself will not open until a substantially greater pressure drop exists across the filter.

In one arrangement, the yieldable biasing means for normally biasing the diaphragm toward the valve body includes a lever connected with such diaphragm and a rotatably mounted shaft is in turn connected with the lever. A spring connected with the shaft normally rotates same in a direction to move the diaphragm toward the valve body by force applied thereto through the lever.

In one arrangement, the diaphragm and valve body are connected together by lost motion connection means which extends through the variable volume chamber for providing limited movement of the diaphragm away from the valve body. The lost motion connection means then bottoms out on the valve body.

In accordance with another aspect of the invention, the spring which rotatably biases the shaft is connected to such shaft by an arm. The line along which the spring force acts moves closer to the shaft as the valve opens and decreases the moment arm. This maintains maximum cracking pressure for the valve while holding full flow pressure drop through the valve to a minimum value.

It is a principal object of the present invention to provide an improved bypass valve assembly.

A further object of the invention is to provide a bypass valve assembly which includes a movable diaphragm for operating a first signal prior to opening of the bypass valve.

An additional object of the invention is to provide a bypass valve assembly which is very reliable in operation, and relatively inexpensive to manufacture and assemble.

Another object of the invention is to provide a bypass valve assembly which is arranged to provide maximum cracking pressure while holding full flow pressure drop to a minimum value.

BRIEF DESCRIPTION OF THE DRAWING

FIG. 3 is a plan view looking generally in the direction of arrows 3—3 of FIG. 1;

FIG. 4 is a cross-sectional view looking generally in the direction of arrows 4—4 of FIG. 3;

FIG. 5 is a cross-sectional view looking generally in the direction of arrows 5—5 of FIG. 4;

DESCRIPTION OF A PREFERRED EMBODIMENT

Figure 1:
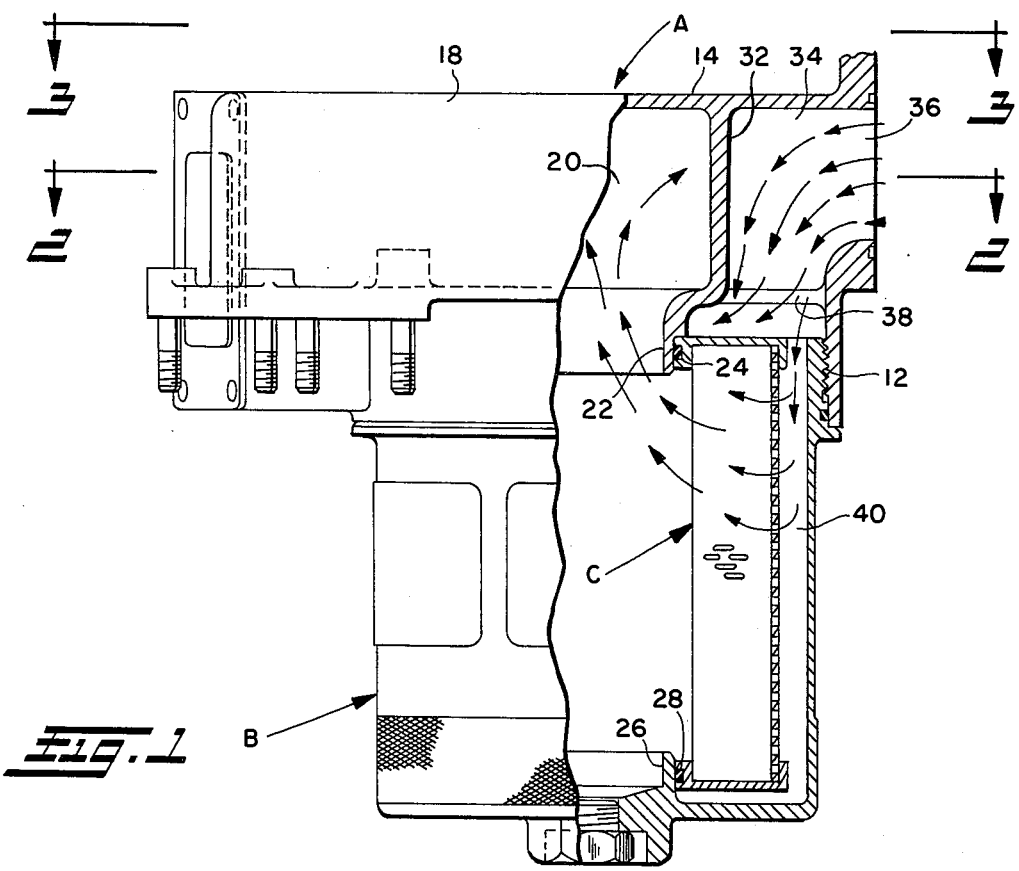
FIG. 1 is a side elevational view of a fuel filter assembly having portions cut away for clarity of illustration.

Referring now to the drawing, wherein the showings are for purposes of illustrating a preferred embodiment of the invention only and not for purposes of limiting same, FIG. 1 shows a fuel filter including a housing A having a filter bowl B removably secured thereto as by threads 12 and containing a generally cylindrical filter element C. Housing A includes top and bottom walls 14 and 16, and a peripheral wall 18 which cooperate to define an outlet chamber 20. A circular opening 22 in bottom wall 16 provides flow of fuel to outlet chamber 20 from the central portion of filter element C which is sealed to opening 22 as at 24 and to a cylindrical flange 26 on bowl B as at 28.

A partition wall 32 extending across peripheral wall 18 between top and bottom walls 14 and 16 separates outlet chamber 20 from an inlet chamber 34 having an inlet port 36 for connection to a pressurized source of fuel and a port 38 communicating with filter bowl B. The outer periphery of filter element C is spaced radially inwardly from the inner peripheral surface of bowl B to provide a circumferential space 40 completely around the outside of filter element C. Fuel flows through ports 36, 38 into space 40 and then generally radially inwardly through filter element C for passage through opening 22 to outlet chamber 20.

Figure 2:
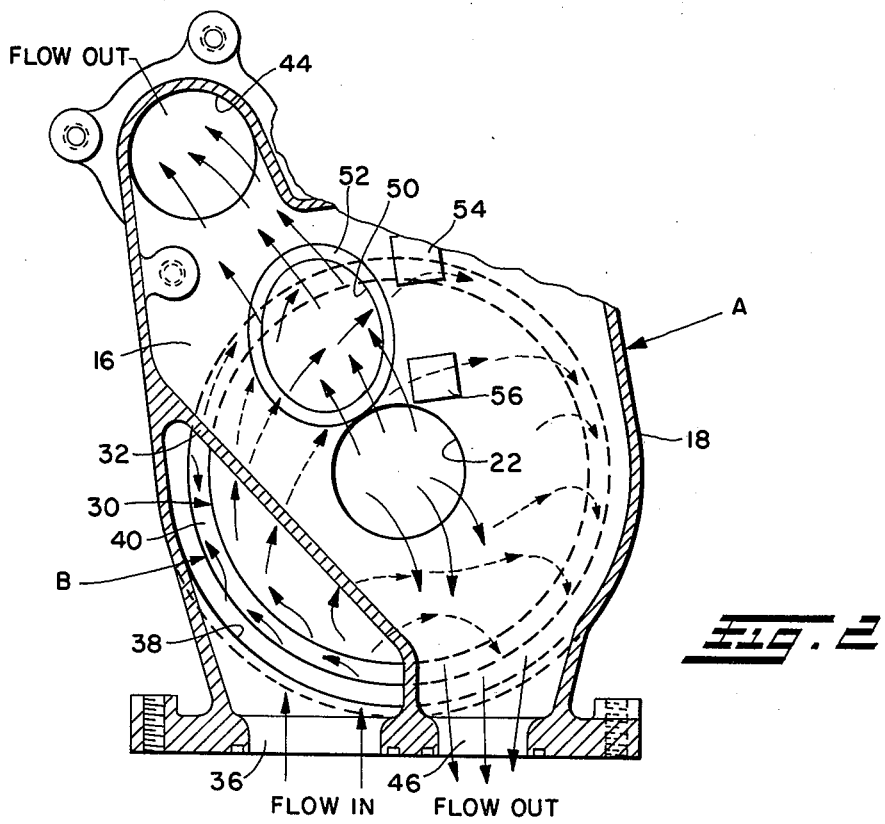
FIG. 2 is a cross-sectional view looking generally in the direction of arrows 2—2 of FIG. 1.

As best shown in FIG. 2, fuel flowing through opening 22 in bottom wall 16 passes through outlet ports 44 and 46 in housing A. Obviously, only one outlet port may be provided if so desired and it is simply conventional to provide a pair of outlets on fuel filters used with jet engines, with one such outlet port leading to the engine and the other to the engine afterburner. Flow to the engine or afterburner is controlled by suitable controls downstream of outlet ports 44 and 46.

As shown in FIG. 2, a bypass outlet 50 is provided in bottom wall 16 in spaced relationship to outlet opening 22. Bypass outlet port 50 has a valve seat 52 extending upwardly slightly from bottom wall 16 into outlet chamber 20 of FIG. 1. Bored lugs or bosses 54 and 56 extend upwardly from bottom wall 16 adjacent bypass outlet port 50 for rotatably mounting a shaft to which a bypass valve assembly is secured for cooperation with valve seat 52.

With particular reference to FIGS. 3–6, top wall 14 of housing A has a generally rectangular opening 60 therein aligned with bypass port 50. Such access opening is normally closed by a removable access panel 62 which provides access to a bypass valve assembly which will be described hereinafter.

An outwardly opening cavity D on housing A has a peripheral wall 64 and a cavity bottom wall 66 which separates cavity D from outlet chamber 20 of FIG. 1. Such cavity is normally closed by a removable access panel 68.

As best shown in FIG. 5, a suitable hole through cavity bottom wall 66 is aligned with the bores in bosses 54 and 56, and a shaft 70 extends rotatably through such hole for rotatable reception in sleeve bearings 72 in the boss bores. Suitable seals are provided for shaft 70 as at 74. A retainer plate 76 cooperates with an outwardly extending flange 78 on shaft 70 for retaining shaft 70 in position.

Figures 6, 7:
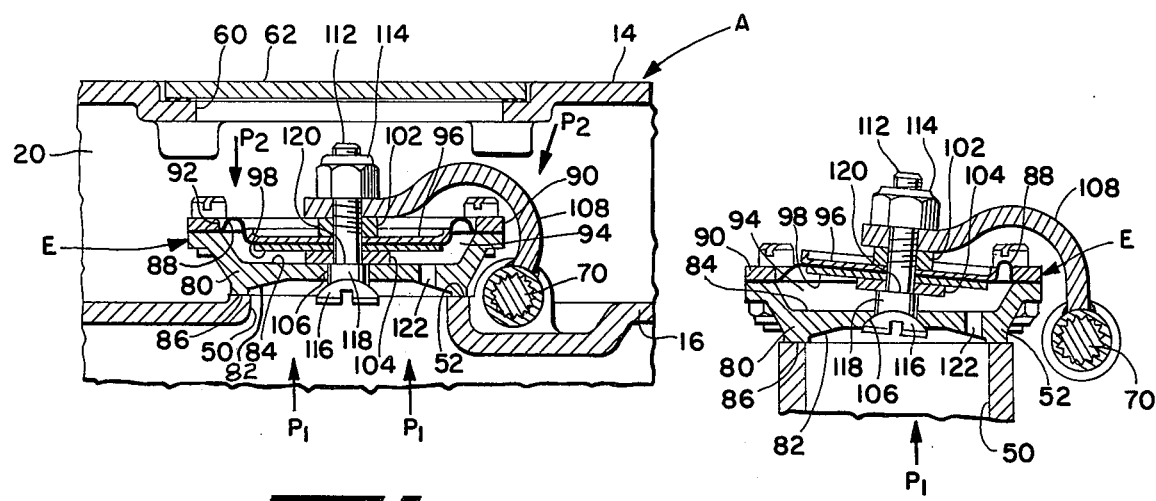
FIG. 6 is a cross-sectional view looking generally in the direction of arrows 6—6 of FIG. 3.
FIG. 7 is a view similar to FIG. 6 and showing the bypass valve assembly in a different condition.

As best shown in FIG. 6, a bypass valve assembly E includes a valve body 80 having an inlet side 82 and a dished opposite side 84, a valve body seat 86 cooperates with valve seat 52 for closing bypass port 50. A movable member in the form of a flexible diaphragm 88 is peripherally sealed to the outer peripheral surface portion of dished opposite surface 84 by a plate member 90 having a central circular hole 92 therethrough for allowing expansion and retraction of diaphragm 88. Valve body opposite surface 84 and diaphragm 88 cooperate to define a variable volume chamber 94.

Washers 96 and 98 are positioned on opposite sides of diaphragm 88, and spacers 102 and 104 are positioned on opposite sides of such washers. A centrally located hole through valve body 80 has a generally conical outer surface 106 on inlet side 82. A lever 108 is suitably nonrotatably secured to shaft 70 between bosses 54 and 56, and has a suitable hole aligned with the central holes through washers 96 and 98, spacers 102 and 104, and valve body 80. A screw 112 having a smooth shank extends through such holes for receiving a nut 114 on the threaded outer end thereof. Undersurface 116 on the screw head has a generally spherical surface of the same radius as spherical seat 106 for cooperating therewith. An enlarged diameter shank portion 118 adjacent the screw head has a length greater than the thickness of valve body 80 between inlet and opposite sides 82 and 84 thereof. Obviously, the centrally located hole through valve body 8 is larger than the holes through the other components in order to slidably receive enlarged diameter shank portion 118. The enlarged diameter portion of the screw shank intersects the smaller diameter portion at a shoulder 120 which bears against spacer 104. A small diameter port 122 extends through valve body 80 for establishing communication between variable volume chamber 94 and inlet side 82.

When the parts are assembled, diaphragm 88, washers 96 and 98, spacers 102 and 104 and lever 108 are tightly compressed between nut 114 and shoulder 120 on screw 112. As best shown in FIG. 4, an arm 126 is splined or otherwise nonrotatably connected with the end of shaft 70 within cavity D. A stud 128 upstanding from cavity bottom wall 66 and a stud 130 upstanding from one end of arm 126 have the opposite ends of a coiled tension spring 132 secured thereto, and spring 132 acts along a longitudinal line of force 134. This in turn normally applies a clockwise turning moment to arm 126 and shaft 70, and the moment arm is measured perpendicular to line of force 134 from the longitudinal axis of shaft 70. The force of spring 132 normally biases shaft 70 counterclockwise as viewed in FIG. 6 and the parts are positioned as shown in that figure during normal operation of the fuel filter. Undersurface 116 of the screw head is spaced outwardly from conical seat 106 so that enlarged diameter shank portion 118 of screw 112 can move generally axially through the central hole in valve body 80.

Washers 96 and 98 are effectively a part of diaphragm 88. Therefore, when reference is made to the diaphragm area, it naturally includes the area of washers 96 or 98 along with the flexible curved part of the diaphragm 88 outwardly of such washers. The effective area of diaphragm 88 is considerably greater than the effective area of inlet side 82 on valve body 80. Opposite side 84 of valve body 80 has generally the same surface area as diaphragm 88. Inlet surface 82 of valve body 80 is subjected to inlet pressure existing in space 40 of FIG. 1 outside of filter element C. The opposite side of valve assembly E is located in outlet chamber 20 of FIG. 1 and is subjected to outlet pressure downstream of filter element C. The inlet pressure has been identified by arrow P1 in FIGS. 6–8, while the outlet pressure has been identified by arrow P2. When filter element C is cleaned, the pressure drop across such filter is relatively small and the differential pressure between P1 and P2 is relatively small. As the filter becomes contaminated, the pressure drop thereacross is substantially increased, and the differential pressure between P1 and P2 increases.

The general operation of the valve will be explained generally with respect to pressures and areas, with insignificant areas being ignored. In the closed position of valve assembly E shown in FIG. 6, the force holding such assembly closed is generally equal to the force of spring 132 which applies force through shaft 70 and lever 108 to valve assembly E, plus outlet pressure P2 acting on the area equivalent to inlet surface 82 of valve body 80. The force tending to open the entire valve assembly is generally equal to inlet pressure P1 acting upon inlet surface 82 of valve body 80.

The diaphragm collapsing force, that is the force tending to move same toward valve body 80, is generally equal to the force of spring 132 plus outlet pressure P2 acting upon diaphragm 88. The diaphragm expanding force, that is the force tending to move same away from valve body 80, is generally equal to inlet pressure in variable volume chamber 94 acting through port 122 upon the area of diaphragm 88.

In view of the fact that the area of diaphragm 88 is considerably greater than the area of valve body 80 on inlet side 82, the pressure necessary in variable volume chamber 94 to move diaphragm 88 outwardly against the force of spring 132 and the opposing outlet pressure is substantially less than the pressure required to move valve body 80 away from seat 52. As the filter becomes clogged and the differential pressure increases, the diaphragm expanding force becomes greater than the diaphragm collapsing force. Therefore, diaphragm 88 moves away from valve body 80 to the position shown in FIG. 7. During expanding movement of diaphragm 88, valve body 80 is held closed by inlet pressure P1 in variable volume chamber 94 acting on the greater area of opposite side 84 plus outlet pressure P2 acting on the equivalent of area 82 and these pressures are opposed by inlet pressure P1 acting on the smaller area of inlet side 82 on valve body 80.

Once diaphragm 88 has been fully extended to the general position shown in FIG. 7, undersurface 116 on the screw head bottoms on conical seat 106. Inlet pressure P1 in variable volume chamber 94 acting on diaphragm 88 pulls on screw 112 and hence on valve body 80 tending to open same. This force is substantially equally resisted by inlet pressure P1 in chamber 94 acting on opposite valve body surface 84 so these forces substantially cancel one another. Therefore, once diaphragm 88 has been fully extended to the position generally shown in FIG. 7, the force which must be overcome to open valve body 80 and move same away from valve seat 82 is generally equal to the force of spring 132 plus outlet pressure P2 acting on the equivalent of area 82. The only force tending to open valve body 80 is now inlet pressure P1 acting upon inlet side 82. Therefore, a considerably greater inlet pressure P1 is required to displace valve body 80 away from seat 52 than that required to expand diaphragm 88. Once inlet pressure P1 increases sufficiently, valve assembly E will move to the open position shown in FIG. 8 so that bypass flow can take place through bypass port 50.

Figures 8, 9:
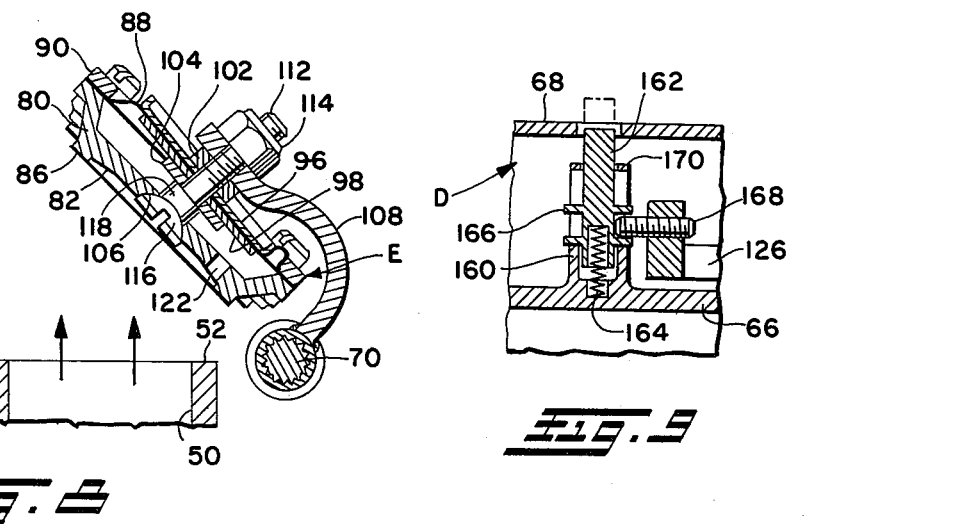
FIG. 8 is a view similar to FIGS. 6 and 7, and showing the bypass valve assembly in an open condition.
FIG. 9 is a cross-sectional view looking generally in the direction of arrows 9—9 of FIG. 4.
Figure 11:
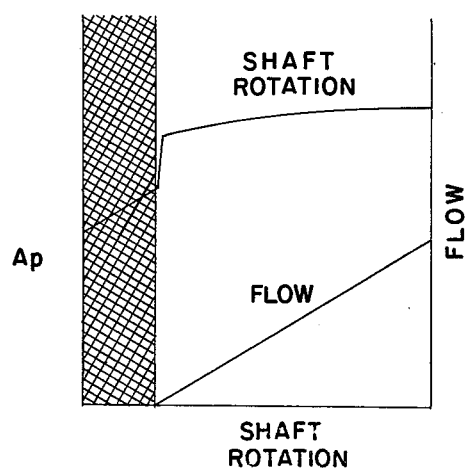
FIG. 11 is a chart showing the different positions of the bypass valve assembly.

With reference to FIG. 4, as valve assembly E begins to move to its full open position in FIG. 8, arm 126 rotates counterclockwise in FIG. 4 so that line of spring force 134 moves closer to shaft 70 and decreases the moment arm at which the spring force acts upon arm 126. This decreasing moment arm during opening of valve assembly E makes it possible for the valve assembly to move relatively rapidly to its fully open position and remain there once initial movement thereof has started due to clogging of the filter element. The sequence of operation can be diagrammatically represented by a chart as shown in FIG. 11. Differential pressure is represented by the left ordinate and this represents the difference in pressure between P1 and P2. Flow is generally indicated on the righthand ordinate. Rotation of shaft 70 in degrees is represented on the abscissa. The hatched area shown at 140 on the chart represents a closed position of valve body 80 wherein it is fully seated against valve seat 52. Shaft rotation is represented by the line on the chart which is labeled shaft rotation. That portion of the shaft rotation line within hatched area 140 represents expanding movement of diaphragm 88 from the position shown in FIG. 6 to the position shown in FIG. 7. Once such diaphragm has been fully expanded, the shaft rotation line shows initial cracking of valve body 80 and then full opening thereof by maximum rotation of the shaft.

With diaphragm 88 defining a movable member which is peripherally sealed against valve body 80, spherical seat 106 and screw head undersurface 116 may be considered cooperating stop means for limiting the movement of movable member 88 away from valve body 80. In effect, screw 112 is a lost motion connection between movable member 88 and valve body 80 which extends through variable volume chamber 94 in order to limit movement of movable member 88 away from valve body 80.

Figure 10:
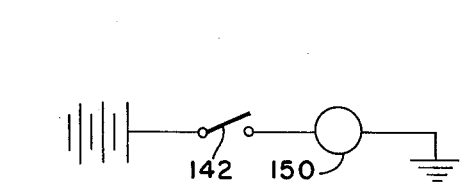
FIG. 10 is a schematic showing of a signal light connected for operation by a switch.

First and second signal means are provided for indicating impending clogging of filter element C and then indicating substantially complete clogging thereof by opening of bypass valve assembly E. With reference to FIG. 4, an electrical switch 142 is suitably mounted to bottom wall 66 of cavity D beneath spring 132 and closely adjacent arm 126. Switch 142 is normally closed and has an operating button 144 acted upon by a pin 146 adjustably secured to arm 126. In the normally closed position of valve assembly E shown in FIG. 6, pin 146 is holding button 144 in a depressed position for maintaining switch 142 open. When diaphragm 88 moves to its extended position as shown in FIG. 7, arm 126 rotates a sufficient distance for moving pin 146 away from button 144 so that switch 142 closes to establish a circuit to an indicator light in the aircraft cabin or the like for indicating clogging of the filter element. This is diagrammatically illustrated in FIG. 10 wherein switch 142 is held in an open position by pin 146 on arm 126. When diaphragm 88 expands and arm 126 rotates counterclockwise in FIG. 4 a sufficient distance to move pin 146 away from switch button 144, switch 142 closes to energize a first signal means in the form of an indicator light 150 shown in FIG. 10. The pilot can then inform maintenance personnel that the fuel filter element should be changed and this can be done before bypass valve assembly E is completely open to bypass dirty fuel to the engine. If the fuel filter element is not changed soon enough, or becomes too contaminated before a change is possible, bypass valve assembly E will move to its open position shown in FIG. 8 and operate second signal means for indicating a contaminated filter. The second signal means is shown in FIG. 9.

A bored boss 160 extending into cavity D from bottom wall 66 thereof slidably receives the bottom end portion of an indicator button 162 which may be colored red. A coil spring 164 within boss 160 bears against the bottom of button 162 for normally biasing same upwardly in FIG. 9. A pair of axially-spaced circumferential flanges 166 on indicator button 162 normally receive a pin 168 on arm 126 for holding button 162 in a retracted position against the force of spring 164, with the outer end of such button below a hole in access panel 68. The radial extent of the slot between flanges 166 on button 162 is sufficiently long that pin 168 remains between such flanges when arm 126 pivots counterclockwise in FIG. 4 upon expansion of diaphragm 88 to the position shown in FIG. 7. Therefore, expansion of diaphragm 88 to its full expanded position of FIG. 7 operates only the first signal means defined by indicator light 150 of FIG. 10. Once bypass valve assembly E opens or begins moving towards its full open position, arm 126 rotates further so that pin 168 is displaced from between flanges 166 on button 162. Spring 164 then biases button 162 upwardly to the shadow line position shown in FIG. 9 so that it is visible exteriorly of access panel 68. When arm 126 rotates back to its full line position shown in FIG. 4 upon shutting down of the aircraft, pin 168 will be beneath bottommost flange 166 in FIG. 9 so that button 162 cannot be pressed back down to its retracted position. This can be accomplished only by removing filter bowl B and filter element C of FIG. 1 from housing A so that manual force can be applied against inlet side 82 of valve body 80 for manually pivoting arm 126 to a position wherein pin 168 will be clear of bottommost flange 166 and manual force on the outside end of button 162 will allow same to be pushed back to its retracted position against the force of spring 164. With button 162 manually held in such position, releasing the manual opening force applied to inlet side 82 of valve body 80 will again allow arm 126 to swing back to its full line position of FIG. 4 under the force of spring 132 so that pin 168 will again be held between flanges 166. Therefore, once the second signal means operates by extension movement of button 162 outwardly of access panel 68, such signal cannot be easily reset without completely removing filter bowl B and filter element C. This prevents a careless mechanic from resetting the clogged filter signal without changing the filter element. A generally U-shaped strap member 170 is suitably secured to bottom wall 66 of cavity D and has a hole therethrough through which button 162 projects. Uppermost flange 166 of FIG. 9 strikes against such strap during extending movement of button 162 for retaining such button with at least a portion of its bottom end located in the bore of boss 160.

It is obvious that many alterations and modifications may be made to the improved bypass valve assembly of the present invention. Instead of using a flexible diaphragm, it is possible to use a movable member in the form of a piston or the like. It is also possible to use an arrangement wherein the valve assembly moves axially instead of generally rotatably in moving between open and closed positions. However, the preferred embodiment disclosed is more advantageous than such alternatives.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. A valve assembly including a valve body having an inlet side and an opposite side and a movable member peripherally sealed to said opposite side and movable toward and away therefrom to define a variable volume chamber, port means past said valve body for establishing communication between said chamber and said inlet side, yieldable biasing means connected with said movable member for normally biasing said movable member toward said opposite side and biasing said assembly in a direction for positioning said inlet side against a valve seat, said yieldable biasing means including a lever connected with said movable member, a rotatably mounted shaft connected with said lever, a spring connected with said shaft for normally rotating said shaft and lever in a direction to move said inlet side against the valve seat, and cooperating stop means between said movable member and valve body for limiting movement of said movable member away from said opposite side, whereby fluid pressure acting on said inlet side is communicated through said port means to said chamber for moving said movable member away from said opposite side against force of said yieldable biasing means until said stop means is reached whereupon fluid pressure acting against said inlet side moves said assembly against force of said yieldable biasing means to separate said inlet side from the valve seat.

2. The valve assembly of claim 1 and further including an arm secured to said shaft, said spring comprising a tension spring fixedly connected at one end and connected to said arm at its other end for exerting force along the spring axis to apply a turning moment to said shaft, said spring axis being movable toward said shaft during movement of said assembly so that the moment arm at which the turning moment is applied by said spring decreases.

3. A valve assembly including a valve body having an inlet side and an opposite side and a flexible diaphragm peripherally sealed to said opposite side and movable toward and away therefrom to define a variable volume chamber, port means past said valve body for establishing communication between said chamber and said inlet side, yieldable biasing means connected with said diaphragm for normally biasing said diaphragm toward said opposite side and biasing said assembly in a direction for positioning said inlet side against a valve seat, said diaphragm and valve body having aligned generally central holes therethrough, a fastener attached to said diaphragm and extending through said holes, said fastener having an enlarged head on said inlet side of said valve body and including a head undersurface spaced from said inlet side when said diaphragm is relaxed, and said head undersurface defining stop means for abutting said valve body after predetermined movement of said diaphragm away from said opposite side, whereby fluid pressure acting on said inlet side is communicated through said port means to said chamber for moving said diaphragm away from said opposite side against force of said yieldable biasing means until said stop means is reached whereupon fluid pressure acting against said inlet side moves said assembly against force of said yieldable biasing means to separate said inlet side from the valve seat.

4. A valve assembly comprising; a valve body having a movable member attached thereto for limited movement away therefrom and defining a variable volume chamber with said valve body, yieldable biasing means attached to said movable member for biasing same toward said valve body and biasing said valve body against a valve seat, port means past said valve body communicating with said chamber, said movable member and valve body being proportioned for providing movement of said movable member away from said valve body against the force of said biasing means under influence of a substantially lower pressure than that required to move said valve body away from the valve seat against the force of said biasing means, a lever connected with said movable member, a rotatable shaft connected with said lever, and said biasing means being connected with said shaft for normally rotating same in a direction for applying force through said lever to move said movable member toward said valve body and said valve body toward a valve seat.

5. A valve assembly comprising; a valve body having a movable member attached thereto for limited movement away therefrom and defining a variable volume chamber with said valve body, yieldable biasing means attached to said movable member for biasing same toward said valve body and biasing said valve body against a valve seat, port means past said valve body communicating with said chamber, said movable member and valve body being proportioned for providing movement of said movable member away from said valve body against the force of said biasing means under influence of a substantially lower pressure than that required to move said valve body away from the valve seat against the force of said biasing means, and said biasing means being connected for applying reduced biasing force when said valve body moves away from the valve seat.

6. The valve assembly of claim 5 including first and second signals respectively connected for sequential operation by movement of said movable member away from said valve body and by movement of said valve body away from the valve seat.

7. The valve assembly of claim 6 wherein said yieldable biasing means includes a lever connected with said movable member, a rotatably mounted shaft connected with said lever, and a spring connected with said shaft for normally rotating said shaft and lever in a predetermined direction to move said valve body against the valve seat, said first and second signals being connected for operation by rotation of said shaft in a direction opposite to said predetermined direction.

8. The valve assembly of claim 7 and further including an arm secured to said shaft, said spring comprising a tension spring fixedly connected at one end and connected to said arm at its other end for exerting force along the spring axis to apply a turning moment to said shaft, said spring axis being movable toward said shaft during movement of said assembly so that the moment arm at which the turning moment is applied by said spring decreases.

9. A filter assembly including a bypass outlet having a seat, a movable valve body normally closing said bypass outlet and having an inlet side and an opposite side, a rotatable shaft, first and second signal means for respectively indicating impending and actual opening of said valve, cooperable operating means between said shaft and said signal means for operating said signal means upon predetermined rotational movements of said shaft, a movable member attached to said opposite side of said valve body and movable toward and away therefrom to define a variable volume chamber therewith, said shaft being connected with said movable member, yieldable biasing means for rotating said shaft in a predetermined direction to normally bias said movable member toward said outlet side and bias said valve body inlet side against said seat, cooperating stop means between said movable member and valve body for limiting movement of said movable member away from said opposite side, and port means past said valve body communicating with said chamber, whereby fluid pressure acting through said port means from said bypass outlet moves said movable member away from said outlet side to rotate said shaft for operating said first signal until said stop means is reached whereupon pressure acting against said inlet side moves said valve body away from said seat and rotates said shaft further to operate said second signal.

* * * * *